INVENTORS
JAMES M. HEGARTY,
DWIGHT S. LORD
BY THEIR ATTORNEYS
HARRIS, KIECH, RUSSELL & KERN

INVENTORS
JAMES M. HEGARTY
DWIGHT S. LORD
BY THEIR ATTORNEYS
HARRIS, KIECH, RUSSELL & KERN

United States Patent Office 3,293,561 Patented Dec. 20, 1966

3,293,561
FREQUENCY SYNTHESIZER

James M. Hegarty, Alhambra, and Dwight S. Lord, Redondo Beach, Calif., assignors to Rutherford Electronics Co., El Segundo, Calif., a corporation of California Filed Sept. 27, 1965, Ser. No. 490,430
11 Claims. (Cl. 331—38)

This invention relates to frequency synthesizers for the production of electrical signals of selected frequencies. The invention is particularly directed to a new and improved frequency synthesizer utilizing digital control to provide for generation of a selected frequency over a wide range. It is an object of the invention to provide such a synthesizer which may have a wide operating range and which may provide for precise control of the selected frequency and which is relatively inexpensive.

It is an object of the invention to provide a frequency synthesizer which utilizes a single oscillator as the source thereby limiting the variables which can affect the accuracy of the output. A further object is to provide such a device wherein the output frequency can be changed easily and can be changed utilizing the digital control. Another object is to provide such a device wherein the output frequency can be changed manually or by remote control or by programmed control. A further object is to provide such a device wherein the output frequency can be increased or decreased as desired.

It is an object of the invention to provide a frequency synthesizer utilizing a cascade-type system providing for a relatively unlimited number of significant figures in the desired frequency. The frequency synthesizer will be described and claimed herein as a decade or decimal or scale of ten system. It should be kept in mind that the invention is equally applicable to other counting systems, such as octal systems, duodecimal systems and the like and that the apparatus described and claimed may readily be converted to another counting system by a person having ordinary skill in the generation and handling of digital information.

It is an object of the invention to provide a frequency synthesizer for providing from a single frequency source a selected one of a range of output frequencies and including frequency divider means having the single frequency source as an input for providing four outputs each of a frequency lower than the single source frequency, with the four outputs related to each other to provide an output count of at least nine in ten counts of the source frequency, and frequency mixer means having the four output frequencies of the divider means as inputs and including switching means for selectively connecting the inputs thereof to an output thereof to provide a selected combination of the four frequencies at the mixer means output.

It is another object of the invention to provide such a frequency synthesizer including a decade counter providing an output pulse for each ten input pulses and having the output of a frequency mixer means as an input, counter storage means for storing the output count of the decade counter, means for providing a timing pulse not coincident with any of the nine counts of the frequency divider means, and an AND gate having the timing pulse and the counter storage means as inputs for coupling the content of the counter storage means into an output circuit at the time of the timing pulse.

It is another object of the invention to provide such a frequency synthesizer including a plurality of frequency mixer means and associated decade counters, counter storage means and AND gates connected in cascade to provide any desired number of significant figures in the selected output frequency.

It is an object of the invention to provide such a frequency synthesizer including a frequency selection storage means for each frequency mixer means and connected thereto for setting the switching means to select a frequency combination corresponding to that set in the storage means. An additional object is to provide such a device in which the storage means includes a bidirectional counter operable to change count state and thereby change the frequency combination to be selected.

Other objects, advantages, features and results of the invention will more fully appear in the course of the following description. The drawings merely show and the description merely describes a preferred embodiment of the present invention which is given by way of illustration or example.

Figure 1:
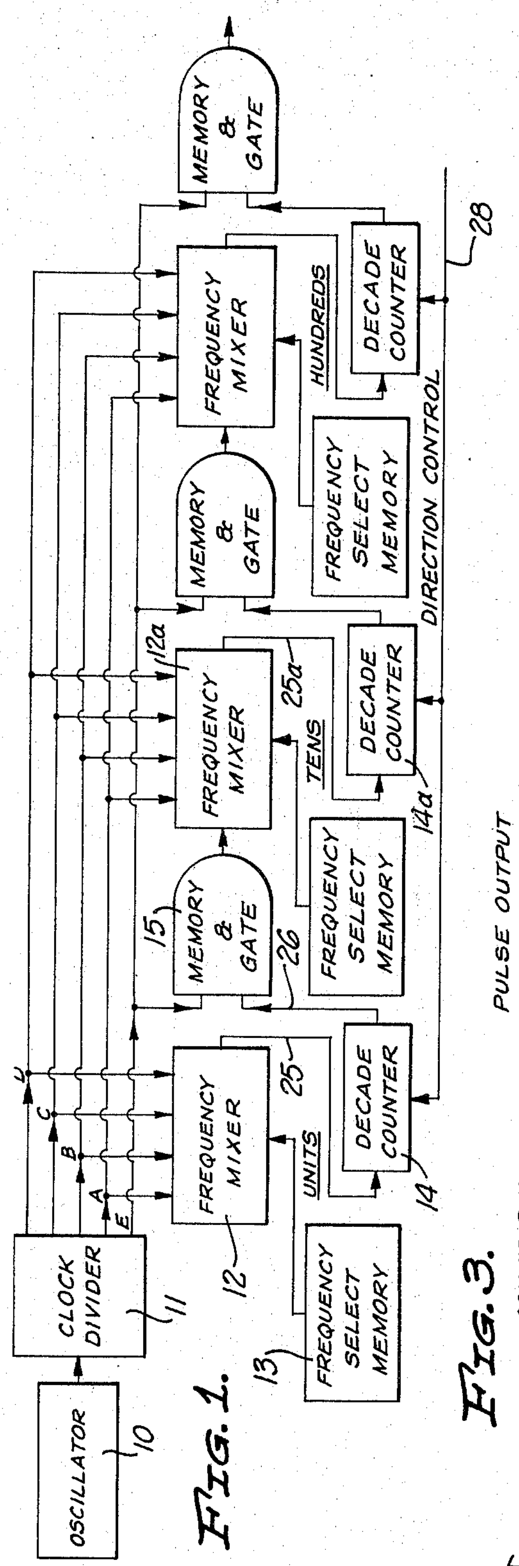
FIG. 1 is a block diagram of a three-significant-figure version of the frequency synthesizer of the invention.

The synthesizer of FIG. 1 includes a pulse source, typically an oscillator 10 which preferably is a crystal-controlled oscillator which provides an accurate and stable input frequency, sometimes referred to herein as $f_1$. The oscillator output is coupled as an input to a clock divider unit 11 which produces four output frequencies on lines A, B, C and D. These four outputs are related to each other so as to provide an output pulse count of at least nine in ten counts of the input frequency to the clock divider. Typically the four output frequencies may be related in a ratio of 1–2–2–4 or 1–2–4–4 or 1–2–4–8. The 1–2–2–4 ratio is preferred as it limits the output count to nine. A preferred form of clock divider is illustrated in FIG. 2 and will be described hereinbelow.

A timing pulse is provided on line E by the clock divider 11. The timing pulse is not coincident with any of the nine counts provided on the outputs A, B, C and D and may be timed to occur in the unused or tenth count. In this manner, the timing pulse can be obtained from the divider of FIG. 2 without requiring any additional components.

The frequency synthesizer of FIG. 1 also includes a series of stages with a stage provided for each significant figure of the desired output frequency. The embodiment illustrated incorporates three stages, identified as the units, tens and hundreds stages. Each stage includes a frequency mixer 12, a frequency select memory 13, a decade counter 14, and a memory and gate 15.

Figure 3:
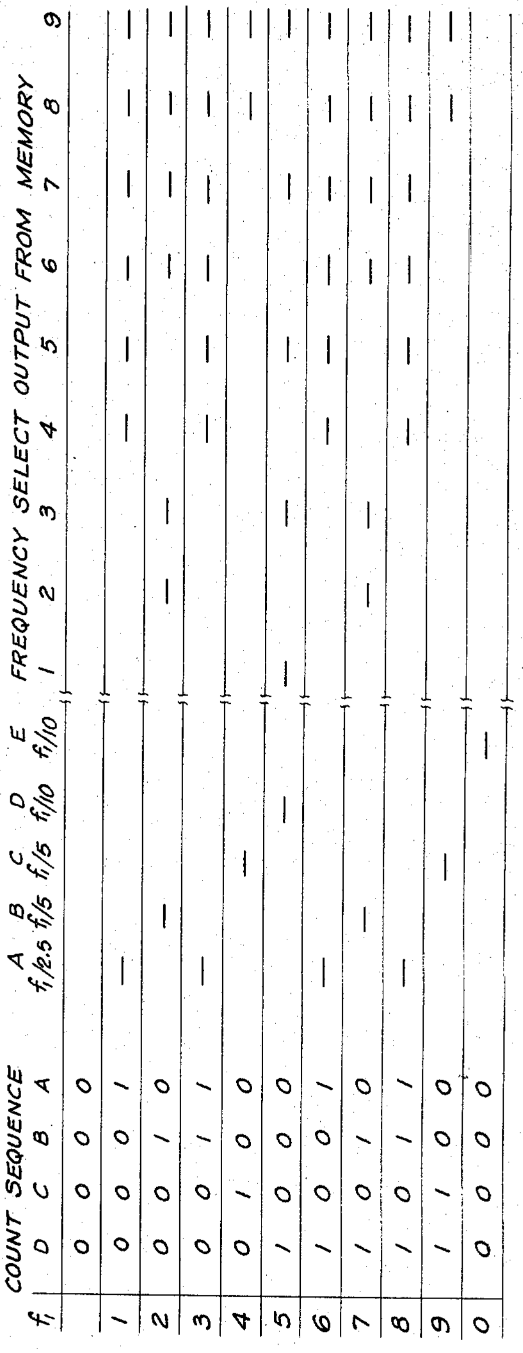
FIG. 3 is a chart illustrating the operation of the clock divider and the frequency mixer.
Figure 2:
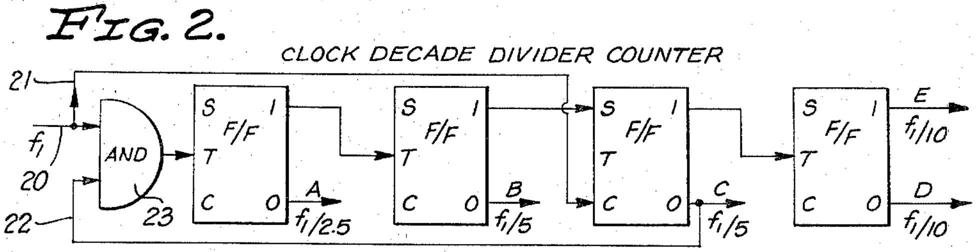
FIG. 2 is a block diagram of the clock divider of FIG. 1.
Figure 4:
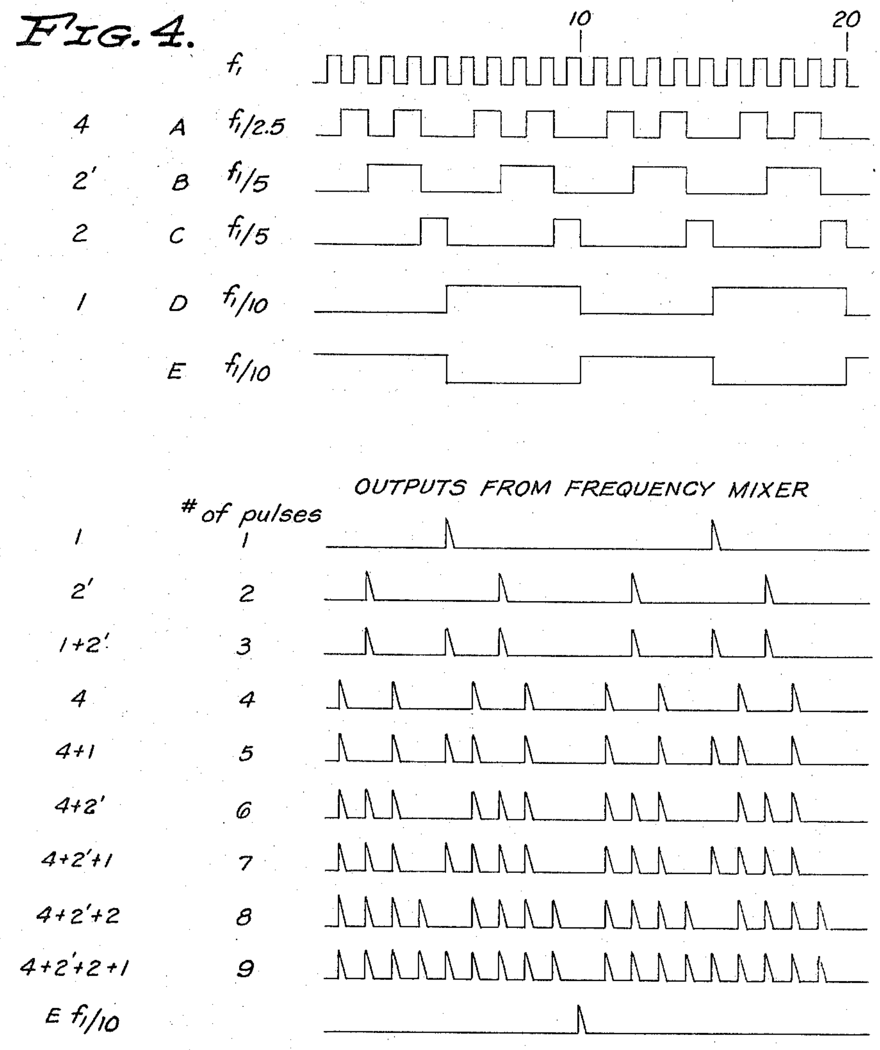
FIG. 4 is a timing diagram illustrating the operation of the clock divider and frequency mixer.

The clock divider 11 may comprise a four flip-flop decade counter as illustrated in FIG. 2 with the input $f_1$ from the oscillator 10 on line 20. A feed forward connection is provided to the third flip-flop on line 21 and a feedback connection is provided from the third flip-flop on line 22 through an AND gate to the first flip-flop. In the diagram, the letters S, C and T identify the set, clear and toggle inputs, respectively, and the numerals 1 and 0 identify the one and zero outputs, respectively. With the connections as illustrated, the time sequence of the counter is as shown in FIG. 3, providing the A-line output from the first flip-flop, the B-line output from the second flip-flop, the C-line output from the third flip-flop, and the D- and E-line outputs from the fourth flip-flop. The timing of the clock divider outputs is shown in FIG. 4. The outputs on the A, B, C and D lines provide for a total of nine pulses in a ten-pulse period for the input $f_1$, with the timing pulse on the E line occurring during the unused time. This timing pulse is used for controlling the transfer of the output of each stage into the subsequent stage via the gate 15.

The frequencies A, B, C and D are connected as inputs to the frequency mixer 12 which is operated to connect various combinations of these inputs to the output line 25 of the mixer. The selection function of the mixer is controlled by the frequency select memory 13 which may comprise a series of manually set switches or series of remotely controlled switches or a programmed set of switches or a counter or other suitable storage unit which can be varied as desired. Typically the frequency mixer 12 will include a group of switches which are actuated corresponding to settings in the memory 13 to connect various of the input lines A, B, C and D through to the output line 25. For example, in order to generate one pulse in the ten-count period, the D line only would be connected through to the output. In order to generate five pulses in the period, the A line and the D line would be connected through. This operation is illustrated in the chart of FIG. 3 and in the timing diagram of FIG. 4. The output from the frequency mixer is connected as an input to the decade counter 14. When the decade counter reaches a count of ten an output pulse is provided on the line 26 and is stored in the memory portion of the unit 15 for introduction into the next stage. When the next timing pulse occurs on the line E, the pulse stored in the memory is gated into the next frequency mixer 12*a* and appears on the output line 25*a* thereof as an input to the next decade counter 14*a*. The operation of each stage is as described above, with additional pulses or counts being introduced during the tenth or timing pulse portion of the ten-count sequence. The number of stages utilized can be extended indefinitely to obtain the desired number of significant figures. The output of each stage is divided by ten at the decade counter for introduction into the next stage, thereby giving the required relationship between stages.

For a particular setting of each frequency mixer of the synthesizer, the device will provide the selected output frequency. The only variable in this system is the frequency $f_1$ from the oscillator 10 and this can be made very stable at relatively little cost. If only a single output frequency is desired from the synthesizer, the frequency mixers can be set for this particular frequency. However, one advantage of this system lies in the fact that the settings of the mixers can be changed with ease to provide any of a wide range of output frequencies. The frequency select memory units provide one mechanism for setting the frequency mixers under a wide range of controls. In one embodiment, the frequency select memories can be counters which are actuated from pulse sources to provide a continuously changing output frequency with the characteristic of the pulse source to the counters controlling the characteristic of the change of output frequency. The frequency select memory counters can be bidirectional counters thereby providing for an increase or a decrease in output frequency as desired. When desired the decade counters 14 may be bidirectional in nature with the direction of count controlled by a signal on a direction control line 28.

As a specific example of operation of the frequency synthesizer, a three-stage device as shown in FIG. 1 can provide an output frequency over the range of 0 p.p.s. (pulses per second) to 999 p.p.s., variable in steps of 1 p.p.s., with an input frequency $f_1$ of 10,000 p.p.s.

To obtain a specific output frequency, such as 567 p.p.s., the units, tens and hundreds stages are set at numbers 7, 6, and 5, respectively, which means that the units frequency mixer connects input lines A, B, and D to the output thereof, the tens frequency mixer connects input lines A and B to the output thereof, and the hundreds frequency mixer connects input lines A and D to the output thereof.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In a frequency synthesizer for providing from a single frequency source a selected one of a range of output frequencies, the combination of:
frequency divider means having the single frequency source as an input for providing four outputs each of the frequency lower than said single frequency, with said four outputs related to each other to provide an output count of at least nine in ten counts of said single frequency; and
frequency mixer means having said four output frequencies of said divider means as inputs and including switching means for selectively connecting the inputs thereof to an output thereof to provide a selected combination of said four frequencies at the mixer means output.

2. In a frequency synthesizer for providing from a single frequency source a selected one of a range of output frequencies, the combination of:
frequency divider means having the single frequency source as an input for providing four outputs each of a frequency lower than said single frequency, with said four outputs related to each other to provide an output count of at least nine in ten counts of said single frequency;
frequency mixer means having said four output frequencies of said divider means as inputs and including switching means for selectively connecting the inputs thereof to an output thereof to provide a selected combination of said four frequencies at the mixer means output; and
a frequency selection storage means for said frequency mixer means and connected thereto for setting the switching means thereof to select a frequency combination corresponding to that set in the storage means.

3. In a frequency syntheizer for providing from a single frequency source a selected one of a range of output frequencies, the combination of:
frequency divider means having the single frequency source as an input for providing four outputs each of a frequency lower than said single frequency, with said four outputs related to each other to provide an output count of at least nine in ten counts of said single frequency;
means for providing a timing pulse not coincident with any of said nine counts;
frequency mixer means having said four output frequencies of said divider means as inputs and including switching means for selectively connecting the inputs thereof to an output thereof to provide a selected combination of said four frequencies at the mixer means output;
a decade counter providing an output pulse for each ten input pulses and having the output of said frequency mixer means as an input;
counter storage means for storing the output count of said decade counter; and
an AND gate having said timing pulse and said counter storage means as inputs for coupling the content of said counter storage means into an output circuit at the time of said timing pulse.

4. In a frequency synthesizer for providing from a single frequency source a selected one of a range of output frequencies, the combination of:
frequency divider means having the single frequency source as an input for providing four outputs each of a frequency lower than said single frequency, with said four outputs related to each other to provide an output count of at least nine in ten counts of said single frequency;
means for providing a timing pulse not coincident with any of said nine counts;

frequency mixer means having said four output frequencies of said divider means as inputs and including switching means for selectively connecting the inputs thereof to an output thereof to provide a selected combination of said four frequencies at the mixer means output;

a frequency selection storage means for said frequency mixer means and connected thereto for setting the switching means thereof to select a frequency combination corresponding to that set in the storage means;

a decade counter providing an output pulse for each ten input pulses and having the output of said frequency mixer means as an input;

counter storage means for storing the output count of said decade counter; and an AND gate having said timing pulse and said counter storage means as inputs for coupling the content of said counter storage means into an output circuit at the time of said timing pulse.

5. In a frequency synthesizer for providing from a single frequency source a selected one of a range of output frequencies, the combination of;

frequency divider means having the single frequency source as an input for providing four outputs each of a frequency lower than said single frequency, with said four outputs related to each other to provide an output count of at least nine in ten counts of said single frequency;

means for providing a timing pulse not coincident with any of said nine counts;

first and second frequency mixer means, each having said four output frequencies of said divider means as inputs and each including switching means for selectively connecting the inputs thereof to an output thereof to provide a selected combination of said four frequencies at the mixer means output;

a decade counter providing an output pulse for each ten input pulses and having the output of said first frequency mixer means as an input;

counter storage means for storing the output count of said decade counter; and an AND gate having said timing pulse said counter storage means as inputs for coupling the content of said counter storage means into said second frequency mixer means as an additional input at the time of said timing pulse.

6. In a frequency synthesizer for providing from a single frequency source a selected one of a range of output frequencies, the combination of;

frequency divider means having the single frequency source as an input for providing four outputs each of a frequency lower than said single frequency, with said four outputs related to each other to provide an output count of at least nine in ten counts of said single frequency;

means for providing a timing pulse not coincident with any of said nine counts;

first and second frequency mixer means, each having said four output frequencies of said divider means as inputs and each including switching means for selectively connecting the inputs thereof to an output thereof to provide a selected combination of said four frequencies at the mixer means output;

a frequency selection storage means for each frequency mixer means and connected thereto for setting the switching means thereof to select a frequency combination corresponding to that set in the storage means;

a decade counter providing an output pulse for each ten input pulses and having the output of said first frequency mixer means as an input;

counter storage means for storing the output count of said decade counter; and an AND gate having said timing pulse and said counter storage means as inputs for coupling the content of said counter storage means into said second frequency mixer means as an additional input at the time of said timing pulse.

7. A device as defined in claim 6 in which said four output frequencies of said divider means are related in the ratio of 1–2–2–4.

8. A device as defined in claim 6 in which said four output frequencies of said divider means are related in the ratio of 1–2–4–4.

9. A device as defined in claim 6 in which said four output frequencies of said divider means are related in the ratio of 1–2–4–8.

10. In a frequency synthesizer for providing from a single frequency source a selected one of a range of output frequencies, the combination of:

frequency divider means comprising a decade counter having the single frequency source as an input for providing four outputs each of a frequency lower than said single frequency, with said four outputs related to each other to provide an output count of at least nine in ten counts of said single frequency, and providing a timing pulse at the tenth count;

frequency mixer means having said four output frequencies of said divider means as inputs and including switching means for selectively connecting the inputs thereof to an output thereof to provide a selected combination of said four frequencies at the mixer means output;

a decade counter providing an output pulse for each ten input pulses and having the output of said frequency mixer means as an input;

counter storage means for storing the output count of said decade counter; and an AND gate having said timing pulse and said counter storage means as inputs for coupling the content of said counter storage means into an output on the tenth count.

11. In a frequency synthesizer for providing from a single frequency source a selected one of a range of output frequencies, the combination of:

frequency divider means having the single frequency source as an input for providing four outputs each of a frequency lower than said single frequency, with said four outputs related to each other to provide an output count of at least nine in ten counts of said single frequency;

frequency mixer means having said four output frequencies of said divider means as inputs and including switching means for selectively connecting the inputs thereof to an output thereof to provide a selected combination of said four frequencies at the mixer means output; and a frequency selection storage means for said frequency mixer means and connected thereto for setting the switching means thereof to select a frequency combination corresponding to that set in the storage means, said storage means including a bidirectional counter operable to change count state and thereby change the frequency combination to be selected.

No references cited.

NATHAN KAUFMAN, *Primary Examiner.*

J. KOMINSKI *Assistant Examiner.*